(12) United States Patent
Ledermann

(10) Patent No.: US 6,278,784 B1
(45) Date of Patent: Aug. 21, 2001

(54) INTERMITTENT ERRORS IN DIGITAL DISC PLAYERS

(76) Inventor: Peter Gerard Ledermann, 54 Stevenson Ave., Cortlandt Manor, NY (US) 10567

( * ) Notice: Subject to any disclaimer, the term of this patent is extended or adjusted under 35 U.S.C. 154(b) by 0 days.

(21) Appl. No.: 09/216,635

(22) Filed: Dec. 20, 1998

(51) Int. Cl.[7] ............................. H04R 29/00; G11B 11/03
(52) U.S. Cl. ........................... 381/58; 369/53.12; 360/31
(58) Field of Search ........................... 369/54, 58, 53.12; 381/56, 58; 360/31

(56) References Cited

U.S. PATENT DOCUMENTS

| | | | |
|---|---|---|---|
| 3,962,724 | * 6/1976 | Koizumi | 360/31 |
| 4,065,647 | 12/1977 | Frye et al. . | |
| 4,467,372 | * 8/1984 | Juodenas | 36/31 |
| 4,608,618 | * 8/1986 | Sturtevant-Stuart | 360/31 |
| 4,736,427 | * 4/1988 | Medin | 381/4 |
| 4,773,094 | * 9/1988 | Dolby | 381/58 |
| 4,852,074 | 7/1989 | Tanaka et al. . | |
| 4,907,181 | 3/1990 | Hedtke et al. . | |

(List continued on next page.)

FOREIGN PATENT DOCUMENTS

| | | | |
|---|---|---|---|
| 004111705 | * 11/1986 | (DE) | 381/56 |
| 2175406 | * 11/1986 | (GB) | 381/58 |
| 2274341 | * 7/1994 | (GB) | 381/56 |

OTHER PUBLICATIONS

Denon, Denon Audio Technical CD, May 1984, 2 pgs, Publication C39–7147–EX, Denon/Nippon Columbia, Japan.

Cochrane (Katherine), CD Testing: The Digital and Analog Sides, orig. pub. in CD–ROM Professional, Feb. 1996, 3 pgs, The CD Information Center: Publication Country assumed=USA.

*Primary Examiner*—Aristotelis M. Psitos
(74) *Attorney, Agent, or Firm*—Mark J. Elting

(57) ABSTRACT

Apparatus and method for automatically and non-invasively detecting and recording random and/or intermittent errors made during play by digital disc players without supervision, without need for invasive player component testing or disassembly, and without need for analyzing complex waveforms, or use of high level processors.

Intermittent errors are found in an actual playback audio signal derived from the output of a digital disc player. A test digital disc prerecorded with a test tone comprising an expected audio signal is played, while an analyzer reads the actual playback audio signal produced, and detects deviations of the actual playback audio signal from the expected audio signal.

To detect deviations of the actual playback audio signal from the expected audio signal, the analyzer can comprise an amplitude detection circuit, a phase detection circuit, and a noise detention circuit, each optionally generating character signals that simplify processing.

Embodiments allow intermittent error detection for players giving only digital output, through a frame decoder and D-A converter to derive, from the actual playback digital signal, the actual playback audio signal needed.

Low required processing power, and the separation and detection of noise are enhanced or facilitated by use of low frequency test tones.

20 Claims, 3 Drawing Sheets

U.S. PATENT DOCUMENTS

| | | |
|---|---|---|
| 5,126,990 | 6/1992 | Efron et al. . |
| 5,212,677 | 5/1993 | Shimote et al. . |
| 5,267,319 * | 11/1993 | Meyer et al. .......................... 381/58 |
| 5,303,093 * | 4/1994 | Kawasaki et al. .................... 360/30 |
| 5,446,716 | 8/1995 | Eastman et al. . |
| 5,446,879 | 8/1995 | Yamamoto et al. . |
| 5,457,673 | 10/1995 | Nakamura et al. . |
| 5,530,761 * | 6/1996 | D'Alayer De Costemore D'Arc .................................... 381/57 |
| 5,644,495 * | 7/1997 | Soutar et al. .......................... 702/77 |
| 5,703,797 * | 12/1997 | Russell ................................. 364/576 |
| 5,740,151 * | 4/1998 | Koh ....................................... 369/58 |
| 5,915,029 * | 6/1999 | Yazurlo et al. ........................ 381/58 |
| 6,115,476 * | 9/2000 | O'Conner et al. ................... 381/103 |

* cited by examiner

INTERMITTENT ERRORS IN DIGITAL DISC PLAYERS

BACKGROUND OF THE INVENTION

This invention relates to testing and troubleshooting of digital disc players and data storage drives. More particularly, it relates to a novel apparatus and method for detecting and recording random and/or intermittent errors made during play by digital disc players or the like, such as those that read or play audio compact discs, CD-ROM discs, or digital versatile discs (DVD). The invention can also be used to detect and record intermittent errors in analog or digital signal paths, as discussed below.

For simplicity of explanation in this disclosure, and merely by way of example, some discussion here addresses testing of players that use various conventional rotating disc media encoded with the CD (Compact Disc or Red Book) format, such as CD-DA (Compact Disc Digital Audio), or DVD (Digital Versatile Disc) formats, where pulse code modulated (PCM) audio, video, or other data is encoded, with error correction and other features, using long strings of physical pits written helically on the reflective surface of a polycarbonate disc. However, the invention shall apply equally well to other present and future formats, such as DVD (digital versatile disc) formats that may use Direct Stream Digital (DSD) encoded data; or future formats where rotating discs or other digital media are played. This would include future solid state media such as photorefractive volume holographic storage (PVHS), where the storage medium is not physically rotated, and where data is accessed by directing a laser beam to various physical portions of a crystal or other solid.

Digital disc systems are known for unprecedented fault tolerance, accuracy and reproducibility. Properly functioning digital disc player systems are generally impervious to noise and major output signal defects due to robust error correction and modulation schemes. When problems with digital disc players do occur, however, their appearance is often intermittent and difficult to discern. Although there tends to be general agreement Concerning format specifications for digital discs, manufacturers of digital disc players have freedom to employ differing designs in their players. This results in a wide variety of player designs, with differing individual error and failure modes, which compounds problem diagnosis.

Aside from problems arising from physical impact and damaged or soiled disc player media, there are component or system problems that manifest themselves in subtle ways. Some of these problems cause random or intermittent errors which are extremely troublesome for CD player repair technicians to locate and diagnose. Time spent on signal or output monitoring in order to make a diagnosis in these cases often can far exceed time spent on repair or replacement of the failing individual components.

Troubleshooting digital disc players is also difficult and, time-consuming because of their complexity. Error correction, synchronization and modulation require electronic and logic circuits; tracking and focusing require optical and electro-mechanical servo systems.

Many intermittent-type failure modes result, in part from: [1] temperature-induced stresses; [2] specific conditions such as wear and accumulation of debris and dirt on mechanical components; [3] factory assembly errors that result in momentary malfunctions; [4] environmental factors such as humidity and dust; and [5] systemic factors resulting from the use of specific assemblies or structures, such as the use of arm-mounted pickups that move in an arc or tangentially across the surface of the storage medium, cable stresses and fatigue, bearing failures, and other electrical, electromechanical, or mechanical defects.

These all present challenges for diagnosis, repair, testing and service of digital disc players. Often, when a digital disc player fails intermittently, it must be tested at length prior to and after repair, in an effort to establish which components or systems are at fault, as well as to provide confirmation that repairs are properly effected and will solve the problem where it originates.

Error correction, synchronization, and modulation all play roles in determining actual signal output. With errors in the pickup signal corrected, compensated or masked by the playback systems in use, the character of digital disc player problems or malfunctions becomes even more intermittent and subtle.

Digital Disc Formats and Player Design

Digital disc formats and players allow high density information storage with nearly error-free retrieval at high bit: rates, in part by use of error correction and modulation schemes. Audio Compact Discs, for example, store a digitized stereo audio signal comprised of two 16 bit words at a sampling frequency of 44.1 kHz. This corresponds to about 1.41 million bits per second (Mbps). Additional required data overhead in the form of formatting, modulation, and notably error correction and synchronization, triple the data rate required to about 4.32 million bits per second (Mbps). The corresponding bit rates for DVD players are substantially higher.

Typically, this information is physically stored on the digital disc in the form of pits or depressions that are formed or impressed into a plastic or deformable substrate. These pits are of various lengths, and are arranged in a helical spiral, starting from the inner radius of the disc. For Compact Discs read by near-infrared AlGaAs lasers with typical wavelength of 780 nm, each pit is about 0.6 microns wide, 0.11 microns deep, and with lengths varying from about 0.8 to 3.6 microns. The helical track pitch is typically 1.6 microns. A typical audio Compact Disc following the CD-DA format may contain 2–3 billion such pits, forming a trail or track on the disc "land" of over 5 km (3 miles) length. This typically yields up to 783 million bytes of usable information, allowing for a typical maximum disc play time of 74–80 minutes. Recent DVD disc players use lasers with a typical wavelengths of 650 and 635 nm (red), and use a higher numerical aperture (NA=0.60) lens. This allows focusing on pits formed on DVD discs having lengths down to 0.4 microns minimum, using a track pitch of only 0.74 microns. Future formats may use smaller geometries.

Light is used to read the pits from the underside (as bumps or protrusions). The underside of the pitted surface is treated to reflect a laser beam, usually via metallization using aluminum, copper or silver by means of vapor deposition, magnetron sputtering, or non-electrolytic wet silvering.

To play the disc, a laser scanning spot is trained upon, and maintained in focus and alignment upon, the underside of the helical pit trail, while the disc is rotated about its central axis at regulated constant linear velocity, typically 1.2 m/s for audio CDs. Data is read via changes in the intensity of reflected laser light.

Refractive properties of the disc, typically a polycarbonate substrate, are arranged so that a relatively large beam spot is internally focused down to a much smaller spot on the plane where the digital disc pits reside. With Compact Discs, for example, an 0.8 mm diameter laser beam impinging upon the plastic disc outer surface is internally focused down to a 1.0 micron scanning spot on the internal data (pit) surface. This allows that the image size of any surface contamination on the surface of the disc (e.g., dust) is small and out of focus. The result is that in practice, obstructions to the laser beam of less than about 0.5 mm length cause no error in the raw data or pickup signal.

The depth of the pits impressed or formed into a typical digital disc is set so that when the laser scanning spot hits the underside of the pits, destructive interference reduces greatly the intensity of laser light reflected. During play, this forms an intensity-modulated reflected beam which is transduced by a photodiode or photodiode array, as known in the art. Abrupt changes in the state of the photodiode or photo diode array are encoded into binary electrical signals.

By a commonly used protocol such as that used for CD and DVD digital discs, each pit edge, whether leading or trailing, is a binary 1, and all areas in between, whether inside or outside a pit, are binary 0's. This data storage method, including various modulation schemes, is more efficient than coding bits directly using simple pits. However, because of the small size of the pits, precise focusing and tracking of the helical pit trail is still required.

At only the industry-accepted CD-DA sampling rate of 44.1 kHz and with 16 bit quantization, over 5 billion ($5 \times 10^9$) binary digits, or bits, are stored per disc, with a typical error rate of the pickup signal during playback of $10^{-5}$ or $10^{-6}$. With an output from the disc of over 4 million bits per second, this translates to a typical bit error rate of 200 bits/sec. Error correction schemes, synchronization, and specialized modulation are required for successful storage and playback, and they influence the error modes and troubleshooting strategies for digital disc players.

Disc encoding, including error correction and modulation, subcode, synchronization, digital player electrical and mechanical design, as well as disc manufacturing and the use of diverse disc formats are well known in the art. See *Principles of Digital Audio* 3rd Edition, © 1995 by Ken C. Pohlman ISBN 0-07-050468-7; also *The Compact Disc Handbook* 2nd Edition, © 1992 ISBN 0-89579-301-6; for background information on repair techniques, see *Troubleshooting & Repairing Compact Disc Players* 3rd Edition © 1996 by Homer L. Davidson ISBN 0-07-015761-8. These references are all incorporated herein in their entirety.

The data recorded on a digital disc is the result of a complex encoding process. Information is coded prior to disc mastering, then decoded during disc playback using a disc player and its electrical processing. As known in the art, data on digital discs is usually formatted into discrete sections of recognizable data called frames.

As an example, when encoding information to be recorded on a disc in Lhe CD-DA format, a single frame, prior to error correction calculations (parity bits), interleaving, and EFM modulation, contains 27 synchronization bits; one 8-bit subcode symbol; two 32-bit parity bit sections; and six 32-bit PCM (pulse code modulated) audio data sections. These 32-bit audio data sections each contain four 8-bit audio symbols, a result of audio sampling (at 44.1 kHz for the CD-DA format), with the audio data alternating between left and right audio stereo channels. Standards for the Compact Disc system as developed by Philips and Sony are contained in a standards document known as the Red Book and are found in IEC (International Electrotechnical Commission) standard BNN15-83-095 and IEC Publication 908, *Compact Disc Digital Audio System.*

For the CD-DA format, generation of the parity bits and interleaving of the data to reduce errors is achieved using CIRC (Cross-Interleave Reed-Solomon Code), as is known in the art. The eight-bit subcode symbol in each frame is extremely versatile. The first two bits in the subcode (P, Q bits) give content parameter information such as the number and length of selections (e.g., songs or files) on the disc. The remaining six subcode bits (R, S, T, U, V, W) may be used for other applications, such as encoding text or graphics.

Before recording onto a Compact Disc, this data is modulated using EFM, Eight-to-Fourteen Modulation, where blocks of 8 bits are converted to blocks of arbitrary 14 "channel" bit patterns that correspond to a run-length limited set of helical pit lengths as known in the art. Blocks of the 14-bit channel data are concatenated by merging bits to assist in clock synchronization and digital sum value management. The result as practiced in the art is a series of pit lengths ranging from 3T to 11T, where T is one channel bit period. This data must be read, manipulated, and interpreted, with the aid of error correction strategies, to provide usable data output.

To do this, many digital disc players presently use diode lasers and laser pickups to read this data encoded on the disc. Optical (laser) tracking and focusing systems usually exploit laser beam(s) configured to allow separate tracking and focusing feedback or correction signals to be generated. One-beam and three-beam systems are presently prevalent in the art.

In the three-beam designs, light from a laser point source is sent through a collimator lens and diffraction grating, thus creating a central maximum beam, surrounded by two first-order secondary beams. The central beam is used for reading data and focusing, while the secondary beams on each side of the central beam are used for radial tracking. To compensate for temperature-related effects, a monitor diode adjacent to the laser diode is used to control the laser power level or intensity.

This three-beam laser light is typically sent through a polarization beam splitter. Transmitted laser light from the splitter (or the equivalent optics) passes to the rotating disc, and the resultant reflected light from the disc is diverted by the splitter, so that the light returns to the photodiode array for generating electrical output signals. To assist the polarization beam splitter in diverting the laser light reflected from the digital disc to the photodiode array, a quarter-wave plate is used in the light path, as known in the art. Changes in the intensity of reflected light impinging upon the photodiode array are transduced for encoding by the digital disc player.

In addition, a focusing or objective lens is placed between the polarization beam splitter and the rotating disc, usually proximate the digital disc.

The objective lens just over the disc is used to focus the beam to a width commensurate with the pit width (typically 1.0 micron for CD-DA formats, and about 0.5 microns for DVD formats). This objective lens is fixed to a two-axis actuator which allows up/down movements of the lens for focusing, and lateral movements for fine tracking the helical pit trail as the disc is played.

The focusing is governed by a servo-driven autofocus system, which for Compact Discs, must keep the laser beam in focus on the disc to within +/−0.5 microns, even for discs having warpage or flatness deviations on the order of +/−0.4 mm (400 microns). In three-beam designs, the autofocus system uses a cylindrical lens and a convex lens, in addition to the objective lens, to produce an astigmatism or distortion of the beam pattern whenever the disc reflective surface moves away from the focal distance of the objective lens. When the distance between the disc reflective surface and the objective (focusing) lens is greater than optimum, the image of the beam received at the photodiode array goes from circular in shape to elliptical. When the distance between the disc and lens is less than optimum, the beam image shape also becomes elliptical, but with its major elliptical axis rotated 90 degrees. A four quadrant photodiode array detects these image shape changes, with the output of each photodiode quadrant used in calculating correction or control signals to effect a change of position in the two-axis actuator controlling the objective lens. This auto-focus system is complicated, and it must act swiftly to maintain focus on the spinning digital disc to within a tolerance of 0.5 microns or less. A mechanical delay in movement of the objective lens twoaxis actuator can result in errors in data read, which may or may not be corrected by error correction circuits, as discussed below.

The extremely fine track pitch of present digital discs (1.6 microns for Compact Discs, 0.74 microns for DVD and similar formats) requires feedback controlled auto-tracking. In three beam systems, the two secondary beams are normally kept in partial alignment with either side of the digital disc pit track. Reflected light from these secondary beams impinges upon an additional set of side-mounted photodiodes (receptors) to generate auto-tracking correction signals. The resulting tracking correction signals are applied to the two-axis actuator for the objective lens.

Mechanically, three beam pickups are mounted on a sled, which may be moved tangentially and/or radially to traverse the disc surface, since the two-axis actuator has limited range of operation, relative to the whole play range of the digital disc. The sled may be moved by a linear motor or a motor-driven lead screw.

One-beam laser pickup designs typically use a semi-transparent mirror in lieu of a polarization beam splitter, and a collimator and objective lens for beam focusing. Upon returning to the photodiode arrays for detection, the laser light reflected from the disc passes through a wedge lens, forming two (split) beams that strike four linearly arranged photodiodes. Servo-driven auto focusing occurs when the focal point of the beam shifts away from optimum. When the split beams draw closer together, as evidenced by the photodiode outputs, the disc is too near; when the split beams diverge, the disc is too far. Information about this light distribution is gleaned from the photodiode arrays, and is used to derive appropriate correction signals.

Similarly, auto-tracking in one-beam designs exploits left/right shifts in the beam with respect to the four photodiodes. Tracking error correction signals are derived accordingly.

Most one-beam pickups are mounted on an arm, which when moved may describe an arc across the disc surface. Aging or soiling of the one-beam pickup can cause the shape of the reflected beam to become unduly asymmetrical. This asymmetry could be interpreted by the digital disc player so as to generate a constant offset in the tracking correction signal, causing the pickup to remain slightly off track. To prevent this, a second tracking error signal is generated by applying an alternating voltage to the coil that controls the tracking; a modulated signal strength results which is then rectified and used to correct the primary tracking signal.

The pickup must move across the digital disc surface to track the entire pit spiral, as well as jump from one macroscopic location to another, such as during program track selection or searching functions. During these jumps, the digital disc player microprocessor usually takes command of the pickup location, with a brake pulse usually generated to slow the pickup prior to settling on a new location.

Difficulty of Diagnosis

The foregoing description of the intricacies of CD-DA format playback is given merely as an example to show the complexity of playback in typical digital disc players. Many factors and shortcomings can produce errors in the output signal of a digital disc player. Errors that occur in large groups, such as those due to debris on the storage medium (if read optically), or such as those due to a momentary open circuit in a pickup signal cable, are called burst errors. Isolated errors of short duration, such as corruption of a single data bit or single data symbol, are called random errors. In the CD-DA standard, for example, random errors are considered to be those that produce single symbol errors in the pickup signal, and last for no more than 17T (time periods) in length.

EFM encoding in the CD-DA system guarantees that a random error will never corrupt more than two symbols, and even/odd CIRC interleaving assures that a two-symbol random error will always manifest itself as a single error in two different data words after de-interleaving. In the CD-DA format, these random errors are always correctable. Error correction occurs at two stages, known in the industry as C1 and C2. The second error correction stage, or C2 decoder, retains a burst error correction capability. This allows that perfect playback of a digital disc is not necessary for error free output from the digital disc player. The error correction circuits can usually completely rectify, from a digital data standpoint, errors encountered in the player's raw or pickup signal. This type of corrected signal which produces a player output free from error is termed an ideal playback.

When, however, an actual playback results in erroneous data or errors that are too severe or lengthy for CD-DA CIRC correction, concealment circuits in the digital disc player then act to determine whether to output the erroneous data directly, interpolate the data, or simply mute (zero) the output. Zeroth order interpolation holds and repeats the previous data value to mask a missing or incorrect data word. First order interpolation replaces erroneous words with a value calculated from previous and subsequent words. It can be seen that although the example here concerns audio data, different data (e.g., video, archival) may require different approaches to dealing with error overloading.

In the case of CD-DA produced audio, however, muting methods for catastrophic errors vary, with some digital disc players fading the signal down. Fade-out begins prior to the flawed data, after which, fade-in is effected.

One source of errors lies in non-random or physical flaws in the digital disc read by the digital disc player. So called E22 and E32 errors represent a digital disc's uncorrectable errors resulting from data blocks that could not be corrected by the C1 and C2 de-interleaving and decoding stages. A number of analog tests are used to measure resulting disc quality during digital disc manufacturing or during evaluation of recordable media such as CD-R and DVD-R discs, where the raw pickup signal, or eye pattern, is evaluated for quality.

In performing quality control on Compact Disc media, for example, industry standard tests of the pickup signal determine the ratios I3/ITOP and I11/ITOP, where ITOP is the ratio of the pickup signal baseline to the top of the I11 signal;

I3 and I11 are the top of the pickup signal amplitudes when reading 3T long and 11T long pits, respectively. Other tests particular to measuring disc quality include measuring [1] Eye pattern DC offset arising from pit/land conditions; [2] Tracking signal radial noise, which is a measure of how much the laser tracking system must move back and forth to keep in alignment with the disc pits; [3] Tracking signal amplitude; and [4] Focus signal amplitude; [5] Crosstalk, which measures relative signal strength or interference from neighboring pit tracks. When track pitch is decreased, packing tracks closer together, cross talk increases. For crosstalk in the pickup signal, a maximum value of 50% relative amplitude is allowed by Red Book specifications for CD's.

These tests characterize the digital disc only, and in the case of DVD's and CD's, they indicate disc physical quality, such as whether or not the disc pits are too deep or shallow, whether the pits are well formed and properly spaced, or whether net reflectivity and interference are within specifications.

These known industry tests are not content driven, as they do not test for fidelity of the player output to the digital disc being played. They only measure the results obtained from the raw pickup signal, and do not measure results of high level processing within the digital disc player. Further, they also do not provide a much needed additional test: detecting and recording errors found in the net output signal from all the circuitry and physical systems of a digital disc player during playback, or similar errors found in the output of a signal path using a known good player or the equivalent, as described below.

Assuming good quality media (digital discs), overall correction performance of a CD-DA compatible digital disc player can be characterized by the number of interpolated sample values for a given bit error rate (BER) in a given time. The lower the interpolation rate for a given BER, the better the random error correction of the digital disc player. Uncorrected errors that pass through the error correction circuitry may result in an audible click on the output, in the case of a CD-DA (audio) system, or in the audio portion of a DVD generated output.

For the CIRC system used for CD-DA formats, a maximum of 4000 bad data bits, equivalent to a physical defect of 2.47 mm track length on the disc, is completely correctable. Longer block errors may be corrected using interpolation for a worst case of 13,700 bad data bits. Undetected errors which pass through correction and concealment circuits, occur less than once per 750 hours of CD-DA play time. Presently used CD-DA format discs in reasonably good condition give about one uncorrected error per disc, which is then processed by error concealment algorithms.

The commonly used CD-ROM format is derived from the CD-DA audio format and is specified in the ISO/IEC (International Standards Organization/International Electrotechnical Commission) 10149 (Yellow Book) standard. A CD-ROM digital disc automatically differentiates itself from an audio CD-DA disc through a Q subcode channel. Ninety-eight 24 byte frames are summed, providing a basic CD-ROM data sectors containing 24 bytes×98 frames, or 2352 bytes total. Many CD-ROM formats (known as Mode 1) use a higher level of "Extended" Error Correction (ECD/ECC) where a Reed-Solomon product code (RSPC) is used to encode each data block. This leaves each sector able to accommodate 2048 bytes of user data and system data, along with an additional 304 bytes for synchronization, headers, mode selection, and the extended error detection and correction. This added error correction lowers the CD-ROM bit error rates down to one uncorrectable bit per $10^{16}$ or $10^{17}$ bits. Similar extended error detection and correction applies to CD-R (recordable, write once) formats that use ISO/IEC 10149 Orange Book standards. These extraordinarily robust error detection and correction schemes make problems in digital disc players even more difficult to locate and diagnose.

Similarly, present and proposed DVD formats, such as DVD-Audio, DVD-ROM, DVD-Video, Divx, and DVD-R, also use robust RSPC error detection and correction schemes. Their long data length and their higher level of error detection and correction makes diagnosis more difficult than ever before. This is in part because these robust error detection and correction safeguards allow correcting—and will mask—many mechanical errors, such as transport wow and flutter, in addition to media (disc) errors caused by media defects, dust, dirt, and fingerprints, etc.

When digital disc players do malfunction, they often do so intermittently or subject to certain conditions. As an example, typical malfunctions for CD-DA or CD-ROM digital disc players include the following behaviors:
[1] Player skips back or forward
[2] Player plays and skips in one place
[3] Player intermittently will not play or will not start
[4] Player disc loading or tray movement problems
[5] Player plays up to a point, and then stops; or will not play certain tracks
[6] Player bypasses a disc (CD) in multiple-play units
[7] Player will not play in random mode or will not follow programming
[8] Player will not play certain discs
[9] Player will not program
[10] Player makes cycling noise
[11] One or both player channels drop out
[12] One or both player channels make noise Most of these problems can occur intermittently, and can in part be caused by any number of physical or non-random conditions, such as:
[1] Defective laser assembly
[2] Dirty (laser) pickup lens
[3] Disc tray home switch corrosion
[4] Defective disc rotation (spindle) motor
[5] Debris clogging commutator of spindle motor
[6] Defective top bearing in spindle motor armature, causing wobble or gyration of rotating disc
[7] Trim height of disc platter out of acceptable range
[8] Stuck laser tracking mechanism
[9] Laser tracking motor open circuit, such as by loss of ohmic contact at tracking motor brushes and commutator
[10] Improper lubrication of laser tracking rail or bearing
[11] Improper movement or lubrication of pin and sleeve bearing in lens focusing assembly
[12] Open, sticking, binding, or chafing of laser pickup cable In performing repair or diagnosis of digital disc player problems, invasive component-by-component testing and observation, or component disassembly, can be difficult or impossible. Extensive error correction circuitry makes troubleshooting defective or malfunctioning players a laborious process. Previously, the only practical method for digital disc player testing to find and characterize intermittent errors was to listen, watch, or monitor the player data or signal output constantly and carefully, taking note of system parameters, such as track number, or time since system startup, when each operational failure occurred. When more than one unit is being serviced, such monitoring is usually not possible by one person.

This long and tedious troubleshooting process is a long-standing problem in the industry, involving long observation periods in search of the nature and cause of intermittent errors playback of digital disc players, many of which are not reliably or readily detectible by technicians.

SUMMARY OF THE INVENTION

These problems are addressed by this invention by providing a novel apparatus and method for automatically and non-invasively detecting and recording random and/or intermittent errors made during play by digital disc players. This invention helps characterize and diagnose intermittent errors and malfunctions without need for invasive player component testing or disassembly.

The invention allows thorough and fine testing of actual playback digital or audio signals from a digital disc player, in a simple and powerful manner, with no need to analyze complex waveforms, or to use expensive, complex equipment employing high level controllers or processors such as used in CD or DVD disc quality control analyzers, where the digital discs are checked for problems. The analyzer used in preferred embodiments of the invention easily detects and logs transients and errors in the actual playback digital or audio signal, including error location, with little processing power needed for detection and analysis. The invention checks the whole player system, not just the pickup signal or raw data stream.

By playing a specially prepared test digital disc, one need only connect an output signal from the digital disc player to the analyzer for testing to be performed. By playing the test digital disc in repeat mode, one may monitor the digital disc player as long as desired to find intermittent errors that would normally require direct careful supervision.

One embodiment includes an intermittent error detection system for detecting intermittent errors found in an actual playback audio signal derived from the output of a digital disc player. The intermittent error detection system comprises a test digital disc. The test digital disc is prerecorded with a test tone that comprises an expected audio signal. The expected audio signal is prepared and recorded onto the test digital disc such that ideal playback of the test digital disc in a digital disc player produces the expected audio signal, and it has at least one non-zero Fourier frequency component that is lower than a chosen reference frequency. The intermittent error detection system also comprises an analyzer for reading the actual playback audio signal produced by the digital disc player when playing the test digital disc, and for detecting deviations of the actual playback audio signal from the expected audio signal in the test tone.

In another preferred embodiment, the non-zero Fourier frequency component has a frequency lower than 10,000 Hertz. The analyzer of the preferred embodiment also comprises a memory that it uses to record the deviations of the actual playback audio signal from the expected audio signal.

In another preferred embodiment, the analyzer comprises an amplitude detection circuit to detect amplitude deviations of the actual playback audio signal from the expected audio signal in the test tone. optionally, the amplitude detection circuit comprises an input processing subsection to transform the actual playback audio signal into an amplitude character signal, and a digitizer to digitize the amplitude character signal for use by the analyzer.

The analyzer can also optionally comprise a phase detection circuit to detect phase deviations of the actual playback audio signal from the expected audio signal in the test tone. This phase detection circuit can also comprise an input processing subsection to transform the actual playback audio signal into a phase character signal, and a phase comparator to digitize the phase character signal for use by the analyzer.

The phase detection circuit can also comprise a capture and compare circuit to determine and store average values for a plurality of measured periods of the phase character signal, and a computing circuit such as an interrupt to subtract a current period measurement from a previous period measurement to generate a jitter measurement of periodicity change. The computing circuit or interrupt can optionally average a plurality of previous measured periods, to make an average period; and subtracts that average period from the current period measurement to generate the jitter measurement of periodicity change.

The analyzer can optionally also comprise a noise detection circuit to detect noise found in the actual playback audio signal relative to the expected audio signal in the test tone, where the noise exceeds a threshold. Optionally, this noise detection circuit can also comprise an input processing subsection to transform the actual playback audio signal into a noise character signal; and a digitizer to digitize the noise character signal for use by the analyzer.

To perform intermittent error detection for digital disc players giving a digital output, another embodiment comprises a test digital disc prerecorded such that a test tone comprising an expected audio signal can be derived from the test digital disc. The test tone is made such that ideal playback of the test digital disc in the digital disc player produces the expected audio signal, the expected audio signal again having at least one non-zero Fourier frequency component that is lower than a chosen reference frequency. This embodiment also comprises an analyzer for reading an actual playback digital signal from the digital disc player when playing the test digital disc, and for detecting deviations of the actual playback audio signal from an expected audio signal, where the analyzer further comprises a frame decoder and a D-A converter to derive, from the actual playback digital signal, the actual playback audio signal that is needed.

Also disclosed are methods for detecting intermittent errors found in an actual playback audio signal derived from the output of a digital disc player. In a preferred embodiment, the method comprises

[1] playing a test digital disc in the digital disc player, the test digital disc prerecorded with a test tone comprising an expected audio signal, such that ideal playback of the test digital disc in the digital disc player produces the expected audio signal, and the expected audio signal has at least one non-zero Fourier frequency component that is lower than a chosen reference frequency, described below;

[2] reading the actual playback audio signal produced by the digital disc player;

[3] detecting deviations of the actual playback audio signal from the expected audio signal in the test tone.

Optionally, this method can also comprise

[4] recording the deviations of the actual playback audio signal from the expected audio signal in the test tone;

In a preferred embodiment, the method can additionally comprise

[5] detecting amplitude deviations of the actual playback audio signal from the expected audio signal in the test tone. This can optionally include

[6] determining and storing average values for a plurality of measured periods of the actual playback audio signal; and

[7] subtracting a current period measurement from a previous period measurement to generate a jitter measurement of periodicity change.

This method can also be refined, optionally comprising:

[8] averaging a plurality of previous measured periods, to make an average period; subtracting the average period from the current period measurement to generate the jitter measurement of periodicity change.

In a preferred embodiment, the method also can additionally comprise

[9] detecting noise found in the actual playback audio signal relative to the expected audio signal in the test tone, said noise exceeding a threshold.

This can optionally include

[10] reading the actual playback audio signal through some signal path; whereby, if the digital disc player is known to be error-free or good—that is, capable of reliable ideal playback—deviations of the actual playback audio signal from the expected audio signal in the test tone that are introduced by the signal path may be detected.

The digital disc player may also be chosen to be a tone generator, such as a solid-state device that generates the test tone by using a memory device which it reads to generate the required modulation; or by using a resonant or oscillatory circuit to generate the test tone.

Low required processing power, and the separation and detection of noise are enhanced or facilitated by use of low frequency test tones. Other objects served by the invention will become apparent from a reading of the specification.

DEFINITIONS

Figure 1:
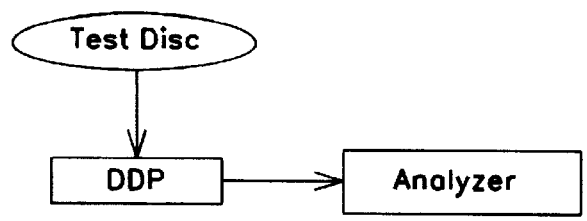
FIG. 1 shows a basic schematic block diagram of elementary elements of an intermittent error detection system for digital disc players according to the present invention.

The following definitions shall be employed throughout:

"Analyzer" shall refer to any system or device that evaluates or characterizes the output signal resulting from the playback of a digital disc player playing a test digital disc, or resulting from the output signal obtained through a signal path via passage of an independently generated test tone signal therethrough.

"Audio" shall refer to either: [1] a signal having a frequency of a mechanical wave that can be detected by the human ear, generally 20–20,000 Hz; or, [2] a signal having a frequency lower than a chosen reference frequency. This shall be noted when interpreting the appended claims, so that the term "audio signal" can, subject to a reference frequency ceiling, include higher frequencies, such as 4.32 MHz.

"Device under test" shall refer to [1] any device, such as a digital disc player, capable of playing a test digital disc wherein its signal output is analyzed using the instant invention; or [2] any device or system comprising one or more signal paths, capable of undergoing testing by an intermittent error detection system as taught here.

"Digital Disc" shall refer to any medium, in any form, such as a rotating disc, digital tape (e.g., DAT, digital audio tape), solid state crystal, memory, or circuit output, that is playable or readable by a digital disc player (see below).

"Digital Disc Player" shall refer to any portable or fixed peripheral, drive, or device that can read a digital disc.

"Error," in connection with digital disc playback, shall refer to deviations of either the pickup signal or the output signal of the device under test from that obtained from perfect playback. If such errors are not detectible after error correction by the digital disc player, (see definition below) the playback is ideal.

"Error Correction" shall refer to corrections and interpolations in any form taken by the digital disc player to remedy errors or inconsistencies in the raw data stream or pickup signal read by the digital disc player, prior to output of its data or signal to another device.

"Intermittent error" shall refer to any intermittent and/or momentary errors during playback by a digital disc player. In practice, Extended play of the digital disc player is normally required to detect and diagnose many types of intermittent errors, but this shall not limit this definition.

"Detectible" shall refer to deviations in the output signal generated during actual playback with respect to that obtained during a perfect playback, that exceed one or more detection thresholds established by the intermittent error detection analyzer. If such deviations do not exceed the threshold, the playback shall be denoted as ideal (see definition below).

"Noise" shall refer to any of various noise factors such as shot noise, Johnson (1/f) white noise, thermal noise, Galvanic noise, triboelectric noise, piezoelectric noise, amplifier noise, and electromagnetically induced noise; or any aperiodic or unwanted or erroneous bits in a data stream. See ref: *The Art of Electronics,* by Paul Horowitz, Winfield Hill, 2nd Edition, Cambridge University Press, © 1989 ISBN 0521370957, which is incorporated herein as a reference in its entirety.

"Output signal" shall refer to any data output, as from a digital disc player, whether such output is analog or digital, and whether it is mediated electrically, optically, magnetically, or using pneumatic, mechanical, or other means.

"Ideal playback" shall refer to the result of a playback of a digital disc with no detectible errors of any kind in its output signal.

"Actual playback" shall refer to a playback signals generated in practice or during player testing or play of a digital disc player, where correctable and non-correctable errors may, or are expected, to occur.

"Perfect playback" shall refer to the theoretical result of a perfect playback of a digital disc with no errors of any kind encountered in the raw data stream or pickup signal read or generated by the digital disc player, and for which no error correction is needed.

"Pickup Signal" shall refer to raw data obtained from playback of the digital disc, prior to subsequent error correction and any demodulation, de-interleaving, or other processing.

"Reference frequency" shall refer to any chosen frequency, such as any or all of the following: [1] a selected frequency in a noise distribution (across different frequencies), such as a mean, mode, or median frequency, or a frequency floor (see discussion below); [2] some frequency of interest, such as a carrier frequency in a signal path, or a particular resonant frequency, such as may be, for example, subject to excitation by locally generated or ambient electromagnetic interference; [3] the bit rate frequency of the device under test, such as the bit rate, in bits per second (bps) of a DVD player (e.g., 10 Mbps); or [4] a frequency between 20 and 20,000 Hz, such as 1000 Hz.

"Signal path" shall include any electrical, optical, electro-optical, pneumatic, mechanical, or other system, or portion thereof, that generates, transmits, carries, or encodes signals to convey information, such as audio, video, or digital data. Examples include transmission lines and cables, connectors, amplifiers, tape drives and recorders, editing boards and equipment, computers or servers, and broadcast equipment.

"Test Digital Disc" shall include any digital disc prerecorded such that ideal or perfect playback of the test digital disc produces an expected audio or test tone signal derived from the output of the digital disc player.

"Test tone" shall include any modulation or information contained or recorded upon a test digital disc that serves the purposes of this invention. This includes any or all Fourier components or the equivalent that comprise audio modulation or information, as well as supplemental content, such as user interface video data, color tests, and the like.

DETAILED DESCRIPTION OF THE INVENTION

Referring to FIG. 1, a basic schematic block diagram of elementary elements of an intermittent error detection system for digital disc players according to the present invention is shown. Data enregistered or prerecorded on a test digital disc (Test Disc) is read by or inputted to a digital disc player DDP, as shown by an arrow. The output signal of the digital disc player DDP when playing the test digital disc is in turn sent or inputted to an analyzer (Analyzer) for monitoring.

The test digital disc contains programming that includes a test tone, whose character may vary widely. The test tone contains an expected audio signal (see definition for "audio" above), but the test tone can be a more complex or different format, such as video, archival data, etc. The only requirement is that the test tone on the test digital disc is prerecorded such that ideal playback of the test digital disc in a properly functioning digital disc player produces an expected audio signal that can be obtained or derived from the output of the digital disc player.

During digital disc player testing, the analyzer reads an actual playback audio or output signal produced by the digital disc player when playing the test digital disc. The analyzer then detects deviations of the actual playback audio signal produced by the digital disc player from the expected audio signal. To the extent that the actual playback signal has errors that are detectible, or that exceed a set of established thresholds, the analyzer detects and records the detected errors for future interpretation or use by the technician, information officer, or consumer. The well-defined and narrow comparison of the actual playback audio signal with an expected audio signal that is tailored to the analyzer, and vice versa, allows a very fast and reliable intermittent error detection using very little processing power, as will be evident below.

The expected audio signal contained in the test tone has at least one non-zero Fourier frequency component that is less than a chosen reference frequency, as discussed below.

For DVD and CD players, for example, the test digital disc can be an industry-standard 120 mm diameter DVD disc, prerecorded such that a test tone comprising movie or video data in the MPEG-2 (Motion Picture Experts Group) format contains and produces in the player two actual playback audio signals that vary or sweep in frequency between 201 to 882 Hz, in the form of left and right audio channels. These audio signal outputs can be inputted into the analyzer using industry standard audio cables from the digital disc player or associated components.

Steps in preparing the test digital disc, including content or signal generation; CD or DVD disc creation, such as preparation of a master tape or disc, mastering of the glass disc, production of the pressing molds; and disc production, including injection molding, metallization, spin coating, printing, packaging, and the requisite quality control, are all well known in the art.

Preferably the test digital disc shall itself be an excellent specimen, such as an industry Grade A, having an average BLER (block error rate) of less than 5/sec; or an industry Grade B, having an average BLER of less than 50/sec. Either of these grades are good for use even for the most stringent CD-ROM, DVD-ROM, or test digital disc applications. Although allowed by Red Book and other standards, industry Grade C discs having average BLER of less than 100/sec are not recommended for test digital discs in this application, as they might themselves, with age and degradation, contribute to errors in the actual playback audio signal.

Figure 2:
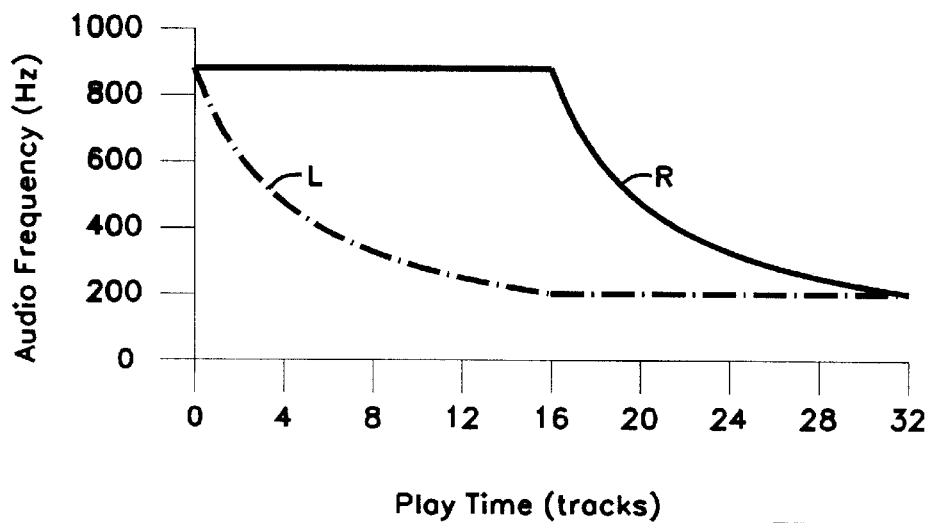
FIG. 2 shows a Cartesian graphical representation of audio frequency versus play time for left and right channel expected audio signal data recorded onto a possible test digital disc according to the present invention.

Referring now to FIG. 2 for this example, a Cartesian graphical representation is given for an example of expected audio signal channels on the test digital disc, showing audio frequency versus play time for left and right channel expected audio signals. The test tone needed to produce these audio signals may contain other information, such as video displays that give test instructions or diagnostic tips to the user.

As shown in the figure, two channels L (broken line) and R (solid line) carry different continuous sound or audio signals, ranging in frequency from approximately 882 Hz to 201 Hz. Solely for simplicity of explanation, a CD in the CD-DA format will be discussed as an example of a possible test digital disc, where the test tone prerecorded thereon consists of audio data contained over 32 tracks in the CD-DA format. Each prerecorded track is of two minute duration, and in this limited example, the test tone consists solely of two expected audio signals, each containing, at any given time, only one Fourier frequency component, uninterrupted throughout as it changes frequency.

At any time, the frequency of one channel of the expected audio signal is sweeping and the frequency of the other is stable. As shown, the left channel L begins at 882 Hz and sweeps down to 201 Hz over the first 16 tracks; over the next 16 tracks, it holds at 201 Hz. The right channel R also begins at 882 Hz, but it holds at 882 Hz over the first 16 tracks; it then sweeps down to 201 Hz over the next 16 tracks.

To allow the analyzer to infer current digital disc playback location during intermittent error testing, the frequency sweeps vary linearly with the signal period. In this example, the period increases uniformly from 1.134 msec (milliseconds) to 4.974 msec as the frequency sweeps from 882 Hz to 201 Hz. This is equivalent to a period increase of 1 msec per second of test time, which totals 64 minutes over 32 tracks of two minutes duration each.

To simplify playback location calculations, the period of the expected audio signal prerecorded on the test digital disc is changed in discrete steps at analog signal zero-crossings.

The data can be recorded in the CD-DA format at a level of 15 bits, giving a volume of −6 dB from maximum. The expected audio signal can have half second volume ramps or tapers from and to silence to avoid sudden changes in volume.

Using this scheme for the expected audio signal in the test tone, current playback location can thus be derived by the analyzer. Play time $T_{play}$ in seconds using this example can be derived by caking the average of the detected periods $T_L$ and $T_R$ of the left and right expected audio signal channels, respectively; subtracting the baseline period (1.134 msec); and multiplying by a conversion factor of 1000 sec/msec:

$$T_{play} = 1000 \text{ sec/msec } (\tfrac{1}{2}(T_L + T_R) - 1.134 \text{ msec}) \quad (1)$$

In addition, left and right expected audio signal channels have the same frequency or period at the beginning and end of the data, which reliably identifies playback of the test digital disc from beginning to end. Left and right channels are also symmetric, so that the analyzer can remain unaffected by switching of the channels. An allowable error in the expected audio signal periodicity of 100 ppm should keep error of the play time $T_{play}$ within one second.

Whether continuous or not, the expected audio signal must have at least one non-zero Fourier frequency component with a frequency that is less than—perhaps sometimes a whole fraction of—a chosen reference frequency. In this example, a two-channel audio signal in the CD-DA format, the upper expected audio signal frequency, 882 Hz, is chosen to be 1/50 times the CD-DA format audio channel frequency $F_S$ of 44.1 kHz.

The chosen reference frequency serves as a ceiling (often a high ceiling) for the expected audio signal frequency to insure that the full purposes of the intermittent error detection system are served. If noise detection is needed, the expected audio signal frequencies used in the prerecorded test tone(s) on the test digital disc should be low enough so as to allow unfettered high frequency detection. It is true that noise control in digital disc players has come a long way, especially for those encoding high fidelity audio information, such as CD-DA players. Aliasing—the introduction of unwanted false (and typically audible) frequencies by an audio sampling system when the input signal to be sampled has frequency components exceeding the Nyquist frequency—has largely been solved in modern audio systems by the use of a sharp low-pass filter, often called an anti-aliasing filter. Such an anti-aliasing filter provides significant or complete attenuation at the Nyquist frequency. Alternatively, over-sampling techniques have pushed unwanted frequencies far beyond the audio frequencies of interest, allowing for relatively noise-free ideal playback, and using soft shoulder filters that are inexpensive, reliable, and more free of harmonic distortion. In spite of this, however, noise from many sources is usually present throughout the circuitry of a digital disc player, particularly when a malfunction or improper condition is present. The noise may take the form of distortion, or other kinds of spurious pulses or voltage spike events of short time duration, from a variety of physical or electrical causes. High frequency expected audio signals having frequencies on the order of those of the noise to be detected make analysis difficult, and the noise to be detected may be masked somewhat by the expected audio signal itself. The chosen reference frequency, under which the frequencies of all expected audio signals in the test tone(s) should remain, could then be chosen to be, for example, a selected frequency in a noise distribution (across different frequencies), such as a mean, mode, or median frequency, or a frequency floor, under which noise is not deemed a concern.

Figure 3:
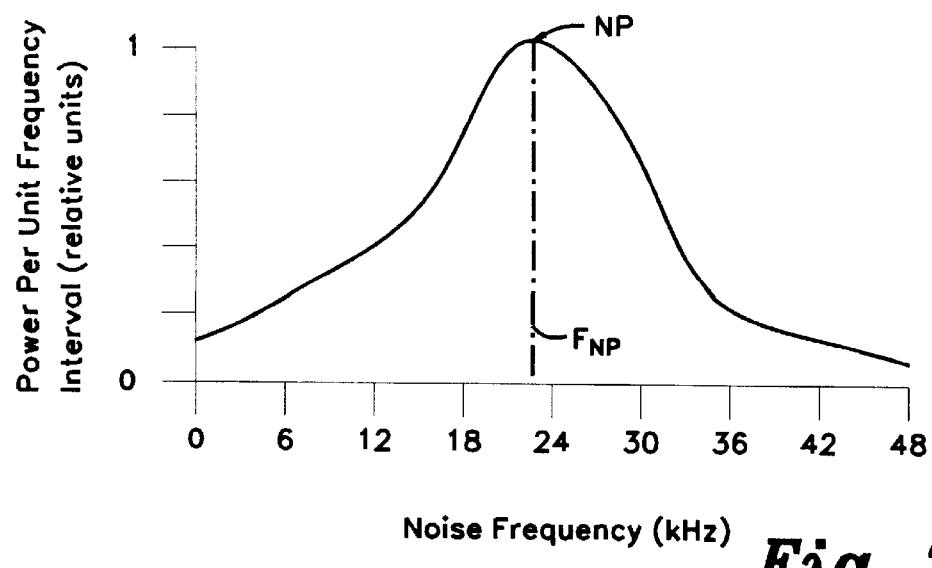
FIG. 3 gives a sample Cartesian graphical representation of noise power per unit frequency interval versus noise frequency for a typic digital disc player and system.

Referring to FIG. 3, a sample Cartesian graphical representation is given, depicting noise power per unit frequency interval versus noise frequency for a typical digital disc player and system. This noise distribution typically has a bell shape, except in the case of severe Johnson (1/f) white noise. The distribution shown, for frequencies ranging from 0 to 48 kHz, has a peak power distribution occurring for a noise peak or mode NP, with a noise peak frequency $F_{NP}$ of about 23 kHz, as shown (broken line). Depending on testing requirements and objectives, one can choose this frequency as a reference frequency, or some frequency below that, such as 6 kHz—to serve as a ceiling for the upper frequency of the highest expected audio signal in the test tone prerecorded on the test digital disc.

One may also select for the reference frequency some frequency of interest, such as a relevant carrier frequency found or used in a signal path or in a transmission system, such as broadcast television, radio, intercom service, etc.

Alternatively, a particular relevant resonant frequency may be chosen, such as a particularly troublesome frequency in the digital disc player or associated equipment that is subject to excitation by locally generated or ambient electromagnetic interference. That way, the expected audio signal frequency does not interfere with detecting noise of frequencies around the resonant frequency. Depending on processing power provided for in the analyzer, one may also choose as the reference frequency higher frequencies, such as the bit rate frequency of the device under test—e.g., the bit rate, in bits per second (bps) of a DVD player (e.g., 10 Mbps). Thus, the reference frequency, and the frequency range of the expected audio signal frequency of the test tone, could be chosen to be as high as possible without exceeding the encoding limits of the format in question. This would typically not apply to high fidelity formats such as CD-DA, where the audio sampling frequency acts as a Nyquist frequency for roughly a maximum resolution of 24 kHz—obviously then, expected audio signal frequencies in excess of this, 1 MHz for example, would not be possible to encode onto the test digital disc. However, a hard data encoding system such as DVD-ROM drives, could perform encoding in excess of conventional 20–20,000 Hz audio frequencies, and could serve the purposes of the invention. Typically, however, an expected audio signal frequency between 20 and 20,000 Hz, such as 1000 Hz, is usually sufficient and adequate for detection objectives.

Figure 4:
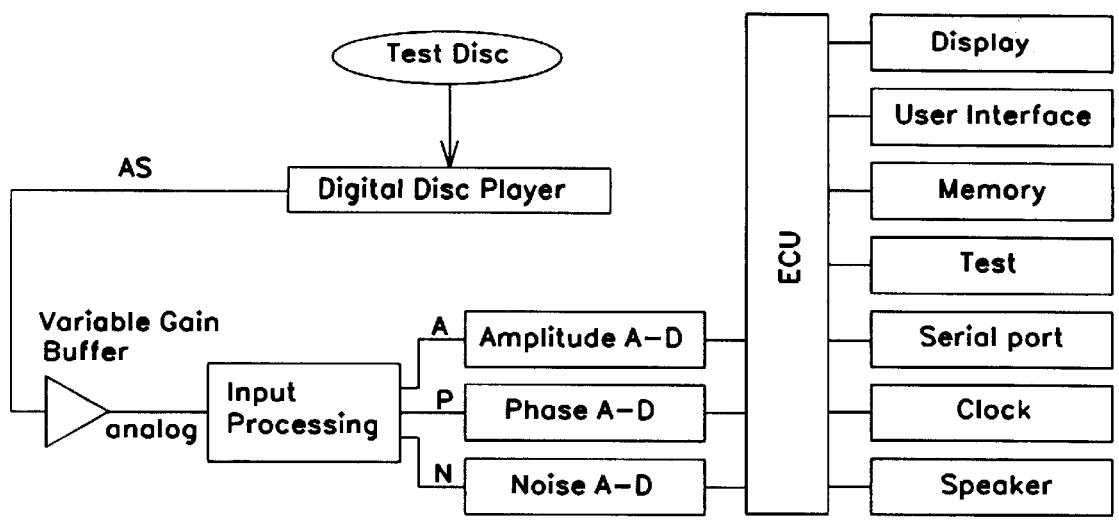
FIG. 4 shows a basic schematic block diagram of an intermittent error detection system according to the present invention, for digital disc players providing analog or audio output.

Now referring to FIG. 4, and by way of introduction, a basic schematic block diagram is shown of an intermittent error detection system, according to the present invention, for digital disc players providing at least analog audio output, such as CD-DA, CD-ROM, DVD, DVD-ROM format players. As before in FIG. 1, a test digital disc (Test Disc) is read by any digital disc player or device under test. The analog signal AS that represents the actual playback audio signal from the digital disc player—which may also be a machine designed for some other (perhaps higher level) format—is inputted to the analyzer, where a first component, a variable gain buffer, as shown, can change the volume or amplitude of the actual playback audio signal input level, as practiced in the art. For ease of use, the variable gain buffer may comprise a known audio taper or linear taper control, a special type of volume control potentiometer used to compensate for the non-linearity of human hearing and give the impression of a linear increase in audibility as volume is raised. The variable gain buffer helps to tailor the intermittent error detection system to different digital disc players and equipment having different output amplitudes, and assures that the analog signal AS is within proper range for subsequent processing by the analyzer.

The analog signal AS entering the variable gain buffer is trimmed and possibly conditioned or impedance buffered, using RC circuits, as known in the electrical arts. The resultant analog signal (shown, "analog") exiting the variable gain buffer is delivered to an input processing section, where expected audio signal(s) generated during actual playback are analyzed. Using known analog techniques, these actual playback audio signal(s) are analyzed by the input processing section (shown, "Input Processing"), forming representative character signals which characterize the actual playback audio signal. The input processing section generates appropriate quantitative analog character signals as required by the detection objectives for the device under test. In this example, an actual playback audio signal amplitude character signal A, an actual playback audio signal phase (or periodicity) character signal P, and an actual playback audio signal noise character signal N, are delivered by the input processing section to respective A-D (analog to digital) converters, labeled Amplitude A-D, Phase A-D, and Noise A-D, as shown. These well known A-D converters prepare amplitude, phase, and noise information about the actual playback audio signal(s) for subsequent processing by an ECU (electronic control unit) ECU, or the equivalent, as shown. The ECU, whose manufacture, selection, programming and use is well known, provides analysis of the actual playback audio signal(s) obtained during actual playback of the test digital disc in the device under test or digital disc player. The ECU can provide a variety of functions, with the ECU interfacing with other components or functions shown, including an analyzer display ("Display"); a user interface, typically comprising momentary-contact command buttons and the like ("User Interface"); memory, ("Memory"), typically DRAM (dynamic random access memory), as known in the art; a test port or the equivalent ("Test"), for analyzer testing; a serial port ("Serial Port") or parallel port or the equivalent, for interfacing with a computer or other device to communicate the results of digital disc player testing and other parameters; a clock ("Clock"), for internal analyzer timing and periodicity measurements, and for ECU processor functioning; and a speaker ("Speaker") to allow user monitoring of the actual playback audio signal(s) generated by the digital disc player, warning or beep tones, etc. Only a small amount of processing power is needed, and low cost processors such as 16C65 8 bit RISC microcontrollers, available from the Microchip Technology Inc., may be used.

Using this intermittent error detection system, and appropriate conventional software code or instructions embedded and/or loaded into the ECU, a digital disc player or other signal path, as described below, may be monitored for hours, or days if necessary (by automatic replay of the test digital disc), in search of intermittent errors. Errors detected can be thus be logged, with the error type, location, and elapsed time noted by the analyzer.

It is important to note that the test digital disc as envisioned in the instant invention is quite distinct from existing standard source or test discs, such as made by companies or organizations like Phillips (410055-2/3, 410055-2/5, 410055-2/5A), Polygram (DHF19/410741-2), Sony (CD3-YED-S7), Denon (38C39-7147 33C39), Technics, the Japan Audio Society, Hi Fi News, Electronic Industries Assoc of Japan, and others. The expected audio signal(s) prerecorded as part of the test tones on the test digital disc are quite unremarkable and simple—the content does not need to be complex, and is not intended to provide discerning information to a critical listener. A single (albeit, possibly changing) Fourier frequency component embedded in a test tone one the test digital disc is all that is needed to meet the purposes of the invention. Thus, as will become evident, the ECU does not need the high amounts of processing power that are usually required when doing complex analog processing and analysis on a signal waveform. It also should be noted that the simple test circuitry as embodied in the input processing section and the A-D converters shown need not be in the form of analog circuits as described here, but may be implemented using known digital signal processing (DSP) techniques instead.

Figure 5:
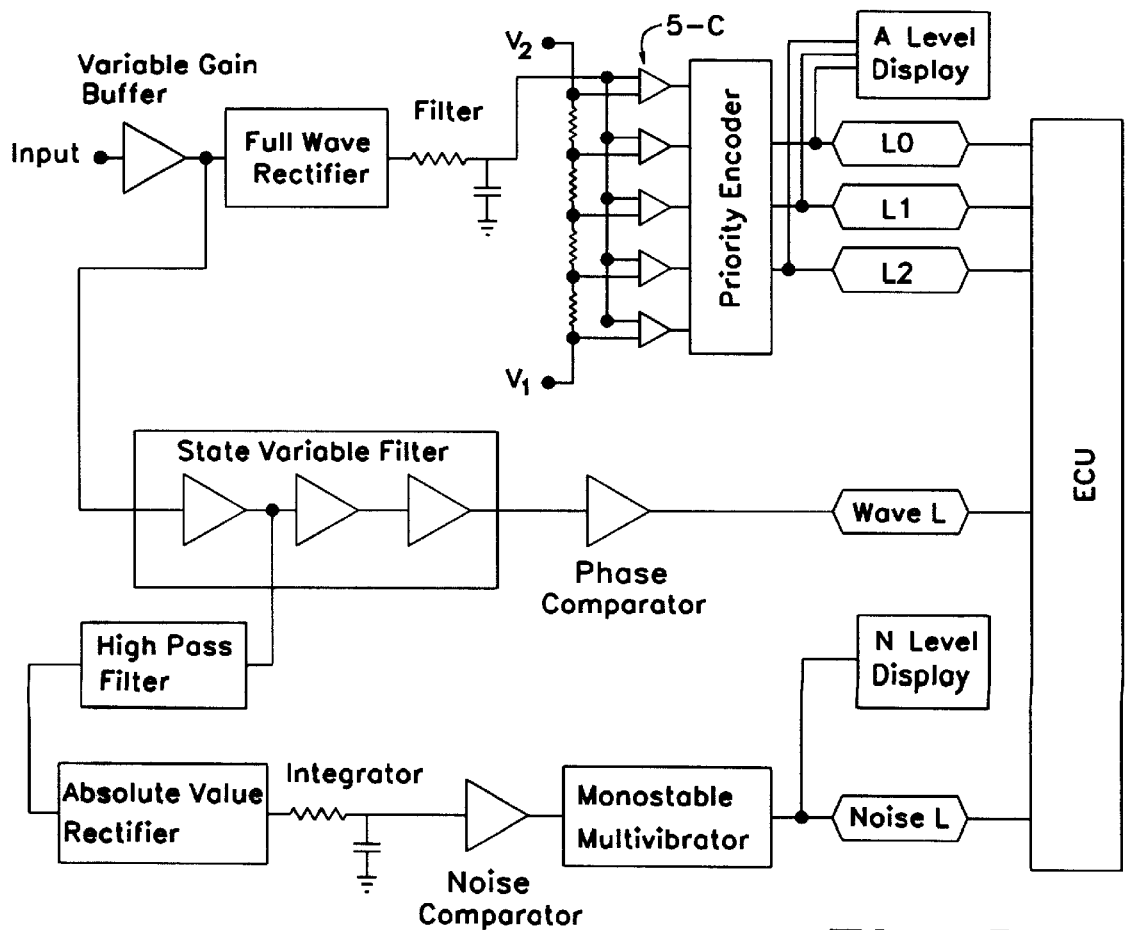
FIG. 5 shows one possible embodiment for an analyzer section for the intermittent error detection system of FIG. 4.

Now referring to FIG. 5, one possible embodiment for an analyzer section for the intermittent error detection system of FIG. 4 is shown. Solely for simplicity of explanation, the discussion here will be tailored to a system for doing intermittent error testing on CD-DA format digital discs, with stereo left and right audio channels.

The input analog expected audio signal (shown at "Input") from a digital disc player (not shown) during actual playback of the test digital disc (also not shown) is again sent through a variable gain buffer, shown. For simplicity of discussion, only the left channel of the resultant actual playback audio signal is described here; similar components and methods as described apply to the right channel, as well. The functions may of course be integrated, if the separation between left and right channels is maintained, such as by use of analyzer internal multiplexing, if desired. ECU interface functions as shown on the right side of above FIG. 4 have been omitted for clarity.

In the analyzer, there is an input processing subsection for amplitude detection, or amplitude detection circuit, where the actual playback audio signal emerging from the variable gain buffer is fed to a full wave rectifier ("Full Wave Rectifier") as shown, then through an RC filter to form an amplitude character signal. The signal is then routed via a known voltage divider, with high and low voltages $V_1$ and $V_2$, to the inputs of five comparators ("5-C"), as shown. The five comparators act as digitizers of the amplitude character signal that represents the actual playback audio signal amplitude. If desired, to keep required processor cost to a minimum, the five digital amplitude signals provided by the five comparators may be encoded and converted to three digital lines by an optional known 8 to 3 line priority encoder ("Priority Encoder") as shown. This priority encoder allows logic states of the three output lines, shown as L0, L1, and L2, to be inputted to the ECU for processing, as shown, and also to allow output to an amplitude level display ("A Level Display"), to give amplitude information to the user of the analyzer. The amplitude level display can allow calibration of the analyzer during its manufacture and testing. However, the main use of the amplitude level display is to allow adjusting the variable gain buffer to an appropriate setting when starting digital disc player testing. This allows calibrating the analyzer for each test to insure accurate high frequency noise detection, as well as to act as a monitor for a change of signal level during testing. This is quite important, as different digital disc players and their respective possible outputs (e.g., headphone, line, port) may have different voltages and impedances. The variable gain adjustment can be enabled using a "calibrate model" switch at the analyzer user interface, not shown, and facilitated by the information on the amplitude level display, where the user may be required to adjust the input to the analyzer to within a given amplitude range.

The actual playback audio signal is also sent to an input processing subsection for phase detection, or phase detection circuit, where the actual playback audio signal emerging from the variable gain buffer is also fed to a state variable filter ("State Variable Filter") as shown, such as a third order filter, which may comprise three operational amplifiers, as known in the art. The state variable filter has both high and low pass outputs. The low pass output parameter values are chosen to allow passage of the actual playback audio signal or phase character signal, having a frequency lower than the reference frequency cited above, to a phase comparator ("Phase Comparator"), for the purpose of turning the actual playback audio signal or phase character signal into a square wave (digital) representation to prepare it for processing by the ECU. The phase comparator acts as a digitizer, and provides a digital line for use by the ECU with phase information, shown as "Wave L," for the left channel signal.

For noise analysis of the actual playback audio signal, another input processing subsection, a noise detection circuit, takes the high pass output from the above state variable filter and routes the high pass signal to additional high pass filtering (shown "High Pass Filter") to an absolute value rectifier ("Absolute Value Rectifier"). The rectified result is then integrated or summed using a passive RC integrator ("Integrator") to accumulate noise generated currents, and thus form a noise character signal. The resulting integrated voltage from the noise character signal is then passed to a noise comparator ("Noise Comparator"), for the purpose of being compared to an established threshold. To create a digital pulse width of specific duration that is compatible with the ECU, the noise comparator output is fed to a digital "one-shot" circuit such as a monostable multivibrator (shown, "Monostable Multivibrator"). The monostable multivibrator and noise comparator act as a digitizer for the noise character signal. The resultant noise level digital signal, shown as "Noise L"is fed to the ECU, and to a noise level display ("N Level Display") on the analyzer for use by the user.

Through the analog circuitry in the analyzer, the microprocessor or ECU is responsible for analyzing the actual playback audio signal, including amplitude detection processing, phase and skip error detection processing through periodicity measurements, high frequency noise detection processing, and channel identification. It is also responsible for handling commands and inputs from the user interface, and interfacing with the analyzer display(s) and speaker. The ECU can also store error information to one or more memory devices, such as an EEPROM (electronically erasable programmable read-only memory) or NVRAM (non-volatile random access memory). It can deliver error data for external (e.g., computer) use via an output port, such as an industry standard RS-232 serial port.

The above actual playback audio signal characteristics that are analyzed in this example for the left channel—that is, amplitude (L0, L1, L2), phase (or periodicity) (Wave L), and noise (Noise L)—are sent to the analyzer ECU in digital form. The analyzer uses these digitized signals to detect deviations of the actual playback signal produced by the digital disc player from the expected audio signal. When the actual playback signal has errors or deviations with respect to the expected audio signal that are detectible or exceeding a set of established thresholds, the analyzer notes and records the detected errors, storing them in NVRAM (non-volatile random access memory) and presents them at the analyzer display. If the error thresholds are not exceeded, the playback is considered ideal and no error logging occurs.

Appropriate controls and thresholds to establish what the analyzer flags as detectible can be programmed into the ECU, as known in the electronic arts. With the amplitude of the actual playback audio signal chosen to be constant, the digital value of the detected amplitude should, if the digital disc player is functioning properly, remain constant. The detection threshold for unacceptable changes in the amplitude of the actual playback audio signal in the test tone can be selected to flag both amplitude dropouts, where the amplitude or signal level is too low (e.g., down 30 percent) and amplitude clips, where the signal level is too high, over an established time period, such as 1 msec. If desired, an algorithm based program can assess both left and right amplitude values and ascertain the level of crosstalk between channels, and flag an error if the crosstalk level exceeds a threshold, such as 1 percent.

Similarly, skip and phase change detection thresholds and protocols can be established in the ECU software. In this embodiment, the digitized or square wave representation of the sine wave signals are analyzed by taking period measurements for each square wave cycle in the Wave L digital signal. A capture and compare circuit (not shown) in the ECU reads the clock on each zero crossing of the square wave, and generates an interrupt, feeding the time value to a register. Using a 16 bit 10 MHz timer in the ECU, the interrupt performs 16 bit and 24 bit calculations, subtracting the capture time from a previously stored capture time to compute the period of the actual playback signal to within 1 $\mu$sec. Using the expected audio signal in the test tone as previously described, it should be between 1134 and 4974 $\mu$sec. It then subtracts this period measurement from the previous period measurement to generate a highly accurate first derivative or "jitter" measurement of periodicity change. Because the expected audio signal frequency sweeps slowly (nominally 1 $\mu$sec/sec), this jitter or difference should be small, e.g., 10 $\mu$sec. If the jitter is larger than this threshold set in the ECU software, a skip, phase error, or signal dropout is detected and logged, depending on possible corroborating data obtained from the amplitude and noise detection circuits, as described. To prevent undue corruption of period measurements by individual faulty measurements, a decayed or running average of the periods is used for the jitter measurement. A method where 8 consecutive "good" periods are averaged is used to calculate the jitter parameter. Because the period changes in the expected audio signal are known, the location or play time at the time of any phase error is always known.

Similarly, stereo noise levels generated by the noise detection circuit are polled by the ECU every millisecond to detect high frequency noise errors. This avoids the need for complex signal processing of the actual playback audio signal. The required time persistence of the noise indicator to trigger a recorded error can also be selected or programmed into the ECU; a time threshold of 1 msec works well in the above embodiment. Noise thresholds for error flagging can be set by software instructions, such as having maximum allowable noise be 30 dB lower than the main amplitude signal.

When errors found in the actual playback audio signal come in bursts, that is, lasting for several milliseconds and triggering several amplitude, phase, or noise indicators, the error indications may be combined and recorded. After the burst, the current location is compared to the previous known location. A measurable difference in location, such as indicated by a 3–15 msec period difference, is flagged by the ECU software as a time discontinuity or skip, unless it constitutes a normal replay, such as when playing non-sequential tracks.

Once errors found in the actual playback audio signal are recorded, they may be displayed individually as they happen on a seven segment error display. The seven segment display may indicate the offending channel, left or right; an amplitude dropout or clip; whether noise thresholds were exceeded; a phase or periodicity error; or whether a skip—a long duration phase error—has occurred. If logging of errors is active or set to occur using the user interface, the error location—in terms of play count (the number of times the whole test digital disc has played, track number, and computed minutes and seconds offset in the track—and an error code, characterizing the error type—are written to the error log in NVRAM (nonvolatile random access memory). The NVRAM retains this data when the analyzer is powered off.

The intermittent error detection system, and in particular, the analyzer, can have various operating modes. For example, the above embodiment can have a "meter" mode where no error or test data is collected, but where input levels and noise indicators are displayed and adjusted. In a "test" mode, the analyzer is functioning to analyze the actual playback audio signal from the digital disc player, and where errors found are detected, displayed, and optionally logged. In a "recall" mode, the resultant error log is displayed, perhaps sequentially, and can be output using a serial port or other port, and printed, etc.

In particular, the "test" mode allows that the analyzer monitors actual playback audio signal amplitude levels, phase or periodicity, and noise levels. The current location on the test digital disc (track and seconds) is computed from the waveform period measurements. During this time, a PLAY display (not shown) on the analyzer shows the current play count, track number, and a code for the most recent error type, if any. Audible alarms can be enabled on the analyzer for each error occurrence. Optionally, the test play can be selected to be random, that is not played sequentially, in order of track number, disc number (on multiple-disc players), sector number, or radial progress on the test digital disc.

In using the intermittent error detection system, one connects to the analyzer a source of the expected audio signal contained in the test tone prerecorded on the test digital disc. This is usually an audio jack, such as an earphone jack or RCA jack, on the digital disc player. Then by putting the analyzer in "meter" mode one can set the analyzer parameters for an acceptable test run, such as by adjusting the variable gain buffer described above, perhaps with the aid of an amplitude display. Then using the analyzer "test" mode one plays the test digital disc in the digital disc player or device under test for as long as deemed necessary. Then using the "recall" mode, one can examine and make inferences from the location, frequency and character of the any errors logged. For example, above problem

[12] Open, sticking, binding, or chafing of laser pickup cable will often cause the digital disc player amplitude signal to dropout for higher track numbers, as the cable is stretched or expanded. Often the open circuit in the pickup cable will occur on or about the same play time on the disc.

On the other hand, one type of spindle motor failure will error on lower track numbers on a test digital disc. This is because the spindle motor turns at higher rotational speeds to play lower (inner) tracks (typically 500 rpm), and turns at progressively lower rotational speeds (typically 200 rpm for 120 mm discs) to achieve the constant linear velocity needed for proper pickup.

A digital disc player which seems to function well under test when playing tracks sequentially, but not for playing tracks in a non-sequential "random" mode, may have above problem

[8] Stuck laser tracking mechanism

Alternatively, problem [8] may occur at intervals (not constantly), indicating a laser tracking mechanism that sticks, binds, or undergoes stick-slip oscillations.

A major intermittent failure in the laser tracking motor or system causes a particular kind of skip. Usually, when the tracking system fails, the laser itself will attempt to correct for the tracking error. Since there is limited lateral movement possible with the laser lens tracking coil(s), the player will only track for a short time, typically 15–120 seconds. Most often the player will make a large skip backwards, often repeating the pattern again. This pattern, too can be discovered using the instant invention, even if only occurring intermittently. In all these cases, the intermittent error detection system described herein can help enormously with diagnosis, by automatically finding and allowing characterizion of intermittent problems. One can also use the analyzer to test players or any analog signal path after repair or manufacture, without using high level controllers or processors.

Nearly all digital disc players, even those that mainly serve to deliver non-audio data allow some form of CD-DA format playback, or some associated audio output. Most CD-ROM drives and DVD formats can play CD-DA discs, for example. This is especially true for multimedia formats. The Green Book CD-I (CD-Interactive) standard, for example, is similar to the CD-ROM standard, except with differences in subheader format. CD-I allows various levels of audio quality to conserve disc space. It also allows storage of video information in three resolution levels, compatible with the US NTSC (National Television Systems Committee) format, the European PAL (phrase alternation line) format, and the SECAM (sequentielle Couleur a la Memoire) used in France and the former Soviet Union. In any digital disc player using this format, test tones can always be devised that contain audio data serving the purposes of this invention, as high sampling frequencies for the encoded expected audio signals are not required.

However, there are or may be future instances where PCM (pulse code modulated) audio bits or symbols or other audio enregistration in the digital disc format is not provided for, or not subject to actual playback. Recall that when encoding information to be recorded on a disc in the CD-DA format or similar formats, a data frame, prior to error correction, interleaving, and modulation, will comprise PCM (pulse code modulated) audio data sections, with the audio data alternating between left and right audio stereo channels. To use the instant invention, and thereby save the necessity for complex, expensive analog signal processing, one can include in the analyzer and test digital disc a means for emulating PCM or other audio formats.

Figure 6:
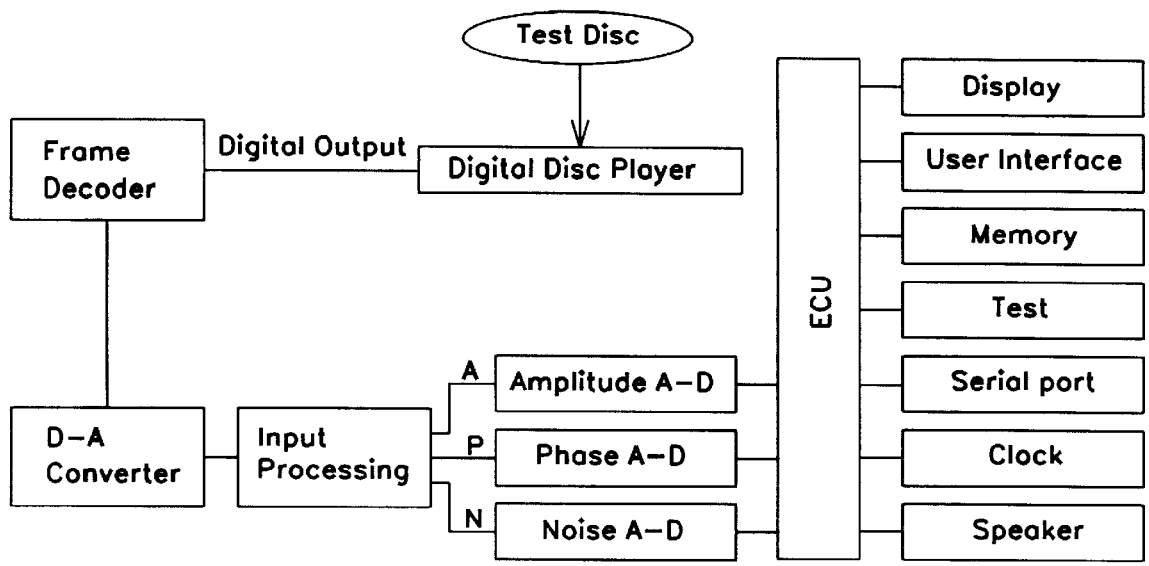
FIG. 6 shows a basic schematic block diagram of an intermittent error detection system according to the present invention, for digital disc players providing digital non-analog output.

Referring now to FIG. 6, a basic schematic block diagram is shown of an intermittent error detection system, similar to that shown in FIG. 4, but for digital disc players providing non-analog audio output. As before, a test digital disc ("Test Disc") is played by the digital disc player or device under test. Normally, a digital output (shown "Digital Output"), not containing analog data, exits such a digital disc player. It is simply necessary to complete the kind of digital-to-analog processing found in digital disc players that read audio, such as in the CD-DA format. The digital output as shown is sent to a frame decoder ("Frame Decoder") and D-A converter ("D-A Converter"), as shown, that are included in the analyzer, whose construction and operation will be known to those in the art. The frame decoder can strip out any subcode from the data frames it receives; reconstruct frames, if necessary; and add synchronization bits, if necessary. One then uses a test digital disc encoded with a test tone whose final processed output in the frame decoder will result in the production of audio data sections. For example, one can devise the digital data on the test digital disc to produce audio data, such as six 32-bit PCM (pulse code modulated) audio data sections, each containing four 8-bit audio symbols, that conform with the CD-DA format, and emulate an audio sampling rate of 44.1 kHz. This PCM audio data would then be converted to analog form by the D-A converter, thus producing a surrogate actual playback audio signal, which is then processed exactly as described above in the description for FIG. 4, starting with the input processing section (shown "Input Processing"). A good quality interface between the digital output of the digital disc player and the frame decoder section of the analyzer, such as a well-shielded transmission line or short cable, will keep internal reflections and jitter of the digital signal to a minimum. To make the analyzer more versatile, this added circuitry can be switchable on the unit, allowing for reading conventional audio-encodable media.

It can be seen that the intermittent error detection system according to this invention can be used to test any analog or digital signal path interposed between a known good digital disc player and the analyzer.

Figure 7:
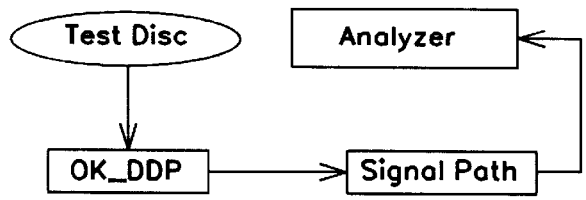
FIG. 7 shows a basic schematic block diagram of elementary elements of an intermittent error detection system according to the present invention, when used with a known good digital disc player to test any analog or digital signal path.

Now referring to FIG. 7, a basic schematic block diagram of elementary elements of an intermittent error detection system according to the present invention are shown, where a known good digital disc player may be used to test any analog or digital signal path. As shown, the test digital disc ("Test Disc") is read by a known, properly functioning digital disc player (shown, "OK_DDP"). The output from the known good player is sent, as shown, through a signal path of any kind, such as another audio, video, or computer system, or a set of transmission lines or cables. A resultant signal generated in the signal path is then fed to the analyzer. With a known good player playing the test digital disc, the actual playback signal arriving at the analyzer is highly likely, in the event of any error, to reflect deficiencies, or errors introduced, in the signal path itself. It can also be seen that this technique can be practiced without use of an actual digital disc player, using instead a solidstate state or other type of tone generator that satisfies the requirements for the test tone, set forth above.

Figure 8:
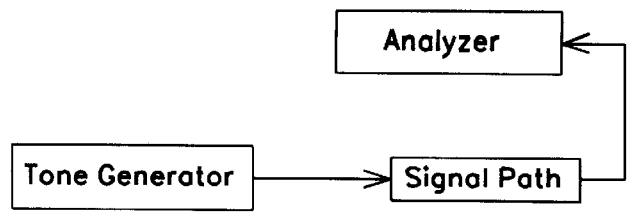
FIG. 8 shows a basic schematic block diagram of elementary elements of an intermittent error detection system according to the present invention, where any analog or digital signal path is tested in conjunction with a tone generator.

Referring to FIG. 8, a basic schematic block diagram of elementary elements of an intermittent error detection system according to the present invention is shown, where any analog or digital signal path is tested in a similar manner to that shown in FIG. 7, but where, in effect, the digital disc player is a solid-state tone generator (shown "Tone Generator"). The design, construction and operation of such a tone generator is well known in the art. The tone generator generates a test tone using any number of known techniques, such as by reading contents of a memory device that encodes an audio signal. For example, a well known WAV format file can be used to encode the expected audio signal(s) in the test tone, and generate the test tone when read by the tone generator. Alternatively, the tone generator may make use of any number of known resonant or oscillatory circuit outputs, to generate a test tone without use of a memory device. Such a circuit can be designed to oscillate so as to emulate, for example, the expected audio signals given above in the description for FIG. 2, including the periodicity (frequency) changes, and ramping to and from silence.

One can use the principles and techniques set forth to analyze any number of channels, such as a single channel analyzer, or an analyzer having many channels, such as a 64 channel analyzer for performing intermittent error testing on a data bus or other signal path.

One can also design digital disc players that incorporate the analyzer of the instant invention. Optionally, the digital disc player can be designed so that running a test digital disc in the player automatically effects the test diagnostics in that player, switching to special circuitry described above (FIG. 6) for non-audio encoded data, if necessary.

The invention as disclosed using the above examples may be practiced using only some of the features mentioned above.

Obviously, many modifications and variations of the present invention are possible in light of the above teaching. It is therefore to be understood that, within the scope of the appended claims, the invention may be practiced otherwise than as specifically described or suggested here.

I claim:

1. An intermittent error detection system for detecting intermittent errors found in an actual playback audio signal derived from the output of a digital disc player, said digital disc player producing data as a function of a pickup position, said intermittent error detection system comprising:
    a test digital disc prerecorded with a test tone comprising an expected audio signal, such that ideal playback of said test digital disc in the digital disc player produces said expected audio signal, said expected audio signal having at least one pure frequency tone;
    an analyzer for reading said actual playback audio signal produced by said digital disc player when playing said test digital disc, and for detecting deviations of said actual playback audio signal from the expected audio signal in said test tone;
    said test digital disc prerecorded such that said pure frequency tone changes frequency in a predetermined manner that allows derivation of said pickup position during any said deviation of said actual playback audio signal from the expected audio signal in said test tone.

2. The intermittent error detection system of claim 1, wherein said one pure frequency tone has a frequency lower than 10,000 Hertz.

3. The intermittent error detection system of claim 1, wherein said analyzer also comprises a memory to record said deviations of said actual playback audio signal from said expected audio signal.

4. The intermittent error detection system of claim 1, wherein said analyzer comprises an amplitude detection circuit to detect amplitude deviations of said actual playback audio signal from said expected audio signal in said test tone.

5. The intermittent error detection system of claim 4, wherein said amplitude detection circuit comprises an input processing subsection to transform said actual playback audio signal into an amplitude character signal (A); and a digitizer to digitize the amplitude character signal for use by the analyzer.

6. The intermittent error detection system of claim 1, wherein said analyzer comprises a phase detection circuit to detect phase deviations of said actual playback audio signal from said expected audio signal in said test tone.

7. The intermittent error detection system of claim 6, wherein said phase detection circuit comprises an input processing subsection to transform said actual playback audio signal into a phase character signal (P); and a phase comparator to digitize the phase character signal for use by the analyzer.

8. The intermittent error detection system of claim 7, wherein said phase error detection circuit comprises:
    a capture and compare circuit to determine and store average values for a plurality of measured periods of the phase character signal;
    a computing circuit to subtract a current period measurement from a previous period measurement to generate ajitter measurement of periodicity change.

9. The intermittent error detection system of claim 8, wherein said computing circuit averages a plurality of previous measured periods, to make an average period; and subtracts said average period from said current period measurement to generate said jitter measurement of periodicity change.

10. The intermittent error detection system of claim 1, wherein said analyzer comprises a noise detection circuit to detect noise found in said actual playback audio signal relative to said expected audio signal in said test tone, said noise exceeding a threshold.

11. The intermittent error detection system of claim 10, wherein said noise detection circuit comprises an input processing subsection to transform said actual playback audio signal into a noise character signal (N); and a digitizer to digitize the noise character signal for use by the analyzer.

12. The intermittent error detection system of claim 1, wherein said pure frequency tone monotonically increases as said test digital disc is played in said digital disc player.

13. An intermittent error detection system for detecting intermittent errors found in an actual playback audio signal derived from the output of a digital disc player, said digital disc player producing data as a function of a pickup position, said intermittent error detection system comprising:

a test digital disc prerecorded such that a test tone comprising an expected audio signal can be derived from said test digital disc, such that ideal playback of said test digital disc in the digital disc player produces said expected audio signal, said expected audio signal having at least one pure frequency tone;

an analyzer for reading an actual playback digital signal from said digital disc player when playing said test digital disc, and for detecting deviations of said actual playback audio signal from an expected audio signal;

said test digital disc prerecorded such that said pure frequency tone changes frequency in a predetermined manner that allows derivation of said pickup position during any said deviation of said actual playback audio signal from the expected audio signal in said test tone;

said analyzer comprising a frame decoder and a D-A converter to derive, from said actual playback digital signal said actual playback audio signal.

14. A method for detecting intermittent errors found in an actual playback audio signal derived from the output of a digital disc player, said method comprising:

playing a test digital disc in said digital disc player, said test digital disc prerecorded with a test tone comprising an expected audio signal, such that ideal playback of said test digital disc in the digital disc player produces said expected audio signal, said expected audio signal having at least one pure frequency tone which changes frequency in a predetermined manner, reading said actual playback audio signal produced by said digital disc player;

detecting deviations of said actual playback audio signal from the expected audio signal in said test tone, for each of said deviations, deriving a pickup position from said pure frequency tone which changes frequency in a predetermined manner.

15. The method of claim 14, additionally comprising:

recording said deviations of said actual playback audio signal from the expected audio signal in said test tone.

16. The method of claim 14, wherein said method comprises:

determining and storing average values for a plurality of measured periods of the actual playback audio signal; subtracting a current period measurement from a previous period measurement to generate a jitter measurement of periodicity change.

17. The method of claim 16, wherein said method comprises:

averaging a plurality of previous measured periods, to make an average period; subtracting said average period from said current period measurement to generate said jitter measurement of periodicity change.

18. The method of claim 14, wherein said method comprises:

detecting noise found in said actual playback audio signal relative to said expected audio signal in said test tone, said noise exceeding a threshold.

19. The method of claim 14, additionally comprising:

reading said actual playback audio signal after said actual playback audio signal has been passed through a signal path;

whereby, deviations of said actual playback audio signal from the expected audio signal in said test tone that are generated by the signal path may be detected.

20. The method of claim 19, wherein said digital disc player is a tone generator.

* * * * *